United States Patent [19]

Fitoussi et al.

[11] 4,237,052
[45] Dec. 2, 1980

[54] METHOD FOR THE PREPARATION OF BITUMENS MODIFIED BY POLYMERS

[75] Inventors: Fredj Fitoussi, St. Genis Laval; Paul Maldonado, St. Symphorien D'Ozon, both of France

[73] Assignee: Elf Union, Paris, France

[21] Appl. No.: 12,459

[22] Filed: Feb. 15, 1979

[30] Foreign Application Priority Data

Mar. 3, 1978 [FR] France ................................ 78 06160

[51] Int. Cl.² .............................................. C08L 91/00
[52] U.S. Cl. ........................ 260/28.5 AS; 260/23.7 H; 260/28.5 B; 260/28.5 D
[58] Field of Search .................. 260/28.5 AS, 28.5 D, 260/28.5 B

[56] References Cited

U.S. PATENT DOCUMENTS

| 3,853,800 | 12/1974 | Haberl | 260/28.5 AS |
| 3,992,340 | 11/1976 | Bonitz | 260/28.5 AS |
| 4,011,184 | 3/1977 | Van Reijendam et al. | 260/28.5 AS |

Primary Examiner—Melvyn I. Marquis
Attorney, Agent, or Firm—Burgess, Ryan and Wayne

[57] ABSTRACT

A process for the preparation of bitumen-polymer compositions, characterized by the fact that the bitumens are modified by grafting of a dihalopolybutadiene polymer that serves as a receptive structure to block polymers and to elastomers co-vulcanizable with the grafted bitumen.

The elastomers are selected from the group that includes linear polybutadiene-polystyrene block copolymers, a polystyrene-polybutadiene block copolymer, and a vulcanizable polynorbornene rubber. They are used as road and industrial bitumens.

12 Claims, No Drawings

METHOD FOR THE PREPARATION OF BITUMENS MODIFIED BY POLYMERS

The object of this invention is a process for the preparation of bitumen-polymer compositions and the products thus obtained. It more particularly refers to bitumens modified by grafting an α,ω-halopolybutadiene polymer that can thus serve as a receptive structure to other polymers.

To be put to their different uses such as binders for surface coatings, road bitumens, or industrial bitumens, bitumens must have a certain number of essential mechanical qualities. Those qualities are defined by different standardized tests among which can be cited:

(A) the softening point determined by the Bille and Anneau test (standard NFT 66,008),
(B) the breaking or Fraass point measured according to the standard IP 80/53,
(C) The penetration value according to the standard NFT 66,004,
(D) the rheologic tensile characteristics: tensile strength threshold $\sigma_s$ in bars elongation at the threshold $\epsilon_s$ in % breaking tensile strength at rupture $\sigma_r$ in bars elongation at rupture $\epsilon_r$ in % measured according to the standard NFT 46,002.

The preparation of industrial bitumens starting from 80-100 bitumens requires the incorporation of at least 10 parts of polymers of medium molecular weight (150,000 to 500,000) or 1 to 3 parts of polymers of high molecular weight (1 to $2 \times 10^6$).

At said rates the polymers are often incompatible with the bitumen. This invention makes it possible to overcome said difficulty by grafting on the bitumen a polymer of low molecular weight including in its chain reactive sites, which favors the incorporation of the incompatible polymer by making it react chemically on the reactive sites of the grafted chain.

Thus, the grafting on the bitumen of a polymer such as α,ω-dibromopolybutadiene in the presence of a catalyst makes it possible to co-vulcanize elastomers such as polychloroprene and polynorborne having a molecular weight of $2 \times 10^6$, the di-block or tri-block copolymers and in particular the polystyrene-polybutadiene copolymer of a medium molecular weight of 75,000 to 150,000.

Another advantage of these compositions resides in the fact that their physical and mechanical properties are further improved by carrying out in situ a covulcanization reaction, by sulfur and vulcanization accelerators, between the grafted polymer and the incorporated polymer.

The improved characteristics of these compositions make them very valued products that can be used in road techniques especially for making coverings or coatings, or in industry as sealing coatings in accordance with the specifications required for one or the other of said uses.

The direct grafting of the α,ω-dihalopolybutadienes and especially the α,ω-dibromopolybutadiene on the asphaltenes of the bitumen is effected in the presence of a catalyst such as zinc oxide at 180° C. for 3 hours and with stirring.

It is recommended to mix from 5 to 10 parts α,ω-dibromopolybutadiene having a molecular weight below 1,000,000 such as the one sold under the name of POLYSAR RTV with 100 parts bitumen. The proportion of catalyst required for the grafting varies between 0.1 and 0.8 part, and is preferably 0.5 part zinc oxide.

The grafted product can be vulcanized in the presence of from 0.1 to 3 parts sulfur per 100 parts modified bitumen and of a vulcanization accelerator at 160° C.

It is likewise possible to add to the bitumen modified by grafting, whether or not vulcanized, from 2 to 10 parts per 100 parts modified bitumen of an elastomer or of a di-block or tri-block copolymer. The incorporation and/or co-vulcanization with the grafted bitumen is carried out by heating at 200° C. for 4 hours.

The invention will be better understood in light of the examples given herebelow by way of non-limiting illustration.

EXAMPLE I 100 parts of SAFANYA (A) having at 25° C. a penetration of 88 measured in 1/10 mm according to the standard NFT 66004 and placing it in the class of 80-100 bitumens are mixed with 10 parts α,ω-dibromopolybutadiene (PM 100,000). Then they are heated, while stirring, at 180° C. for three hours in the presence of 0.5 part of a zinc oxide catalyst. There is obtained the product (B) having:

the softening point (Bille-Anneau) measured in °C. according to the standard NFT 66008 and the Fraass point measured in °C. according to the standard IP 80/53 clearly improved in comparison to those of the staring bitumen (A). This can be seen in table I.

EXAMPLE II

The same conditions described in Example (I) are observed, but the addition of zinc oxide is omitted.

There is obtained the product (C), the physical characteristics of which given in table I are not as good as those of product (B).

EXAMPLE III

The same conditions described in Example (I) are observed, but the addition of the polymer is omitted. There is obtained the product (D), the physical characteristics of which described in table I are not as good as those of product (B).

EXAMPLE IV

To 100 parts modified bitumen (B) is added 0.2 part sulfur. The reaction mixture is then heated for one hour at 160° C. in the presence of a vulcanization accelerator such as stearic acid, mercapto-2-benzothiazole and di-ortho-tolyl guanidine. There is obtained the product (E), the physical characteristics of which given in table I show that the softening point is improved in comparison to (B).

EXAMPLE V

To 100 parts modified bitumen (B) are added 2 parts polynorbornene (fines of NORSOREX sold by C.D.F. Chimie). The mixture is heated for 4 hours at 200° C. while stirring. There is obtained the product (F) characterized by good homogeneity and having an improved plasticity range in comparison to (B) as can be seen in table I.

EXAMPLE VI 100 parts modified bitumen (E) are treated following the conditions of Example V. There is obtained the product (G) that has a softening point clearly higher than (E) (see table I).

EXAMPLE VII 100 parts modified bitumen (F) are treated following the same conditions as in Example IV. There is obtained the product (H) that has a softening point higher than (F) (see table I).

TABLE I

| Products | Physical Properties | | |
|---|---|---|---|
| | softening point °C. | Breaking point in cold (Fraass point) °C. | Penetration at 25° C. in 1/10 mm |
| (A) | 48 | −18 | 88 |
| (B) | 60 | −29 | 69 |
| (C) | 52 | −20 | 80 |
| (D) | 52 | −20 | 60 |
| (E) | 68 | −29 | 60 |
| (F) | 99 | −29 | 39 |
| (G) | 111 | −29 | 40 |
| (H) | 112 | −22 | 34 |

EXAMPLE VIII

To 100 parts modified bitumen E is added 1.5 part α,ω-dodecanedioic acid. There is observed an increase of the softening point without alteration of the behavior in cold as indicated in table II. The plasticity range, difference between the Fraass point and the softening point, is therefore improved.

EXAMPLE IX

To 100 parts modified bitumen B are added 5 parts of the linear tri-block copolymer polystyrene-polybutadiene-polystyrene designated by the name CARIFLEX TR 1101 of a molecular weight of 150,000. The mixture is heated 4 hours at 200° C. in the presence of 0.2 part sulfur and of a vulcanization accelerator. As it can be seen in table II the vulcanization does not affect the Fraass point and leads the mixture the characteristics of an industrial bitumen.

EXAMPLE X

To 100 parts modified bitumen B are added 10 parts of the block copolymer polystyrene-polybutadiene sold by Phillips Petroleum under the name SOLPRENE 411 and the properties without and after vulcanization are compared (see table II).

EXAMPLE XI

To 100 parts modified bitumen B are added 2 parts of a vulcanizable polynorbornene rubber of a molecular weight of 2,000,000 sold by CDF Chimie under the name NORSOREX.

TABLE II

| Examples | Mixtures | Physical properties | | |
|---|---|---|---|---|
| | | Softening Point °C. | Breaking point in cold ° C. (Fraass point) | Penetration at 25° C. in 1/10 mm |
| | Dibromopolybutadiene-grafted bitumen | 68° C. | −29° C. | 60 |
| XIII | Dibromopolybutadiene + 1.5 part dodecanidioic acid-grafted bitumen | 83° C. | −32 ° C. | 41 |
| IX | Modified bitumen 100 parts Cariflex TR 1101 5 parts | 78° C. | −28° C. | 47 |
| | Same mixture co-vulcanized | 97° C. | −26° C. | 40 |
| X | Modified bituman: 100 parts Solprene 411: 10 parts | 98° C. | −28° C. | — |
| | Same mixture vulcanized | 125° C. | — | 30 |
| XI | Modified bitumen: 100 parts Norsorex: 2 parts | 99 | −29 | — |
| | Same mixture vulcanized | 112 | −22 | 34 |

What is claimed is:

1. A process for the preparation of a bitumen-polymer composition comprising grafting, by heating in the presence of a catalyst, at a temperature of 180° C. for 3 hours, 5 to 10 parts of a dihalopolybutadiene polymer on to 100 parts of the bitumen, said polymer serving as a receptive structure for block polymers and to elastomers co-vulcanizable with the grafted bitumen.

2. A process according to claim 1, wherein the dihalopolybutadiene polymer is an α,ω-dibromopolybutadiene of a molecular weight below 100,000.

3. A process according to claim 2, wherein the reaction is effected in the presence of from 0.1 to 0.8 parts zinc oxide as catalyst.

4. A process according to claims 1, 2 or 3, further comprising vulcanizing the grafted bitumen in the presence of from 0.1 to 3 parts sulfur per 100 parts bitumen modified by grafting.

5. A process according to claim 4, wherein the vulcanization is conducted in the presence of a vulcanization accelerator selected from the group consisting of a mercaptobenzothiazole and a diorthotolylguanidine.

6. A process according to claim 4, wherein the grafted bitumen is vulcanized at a temperature of from 140° to 200° C.

7. A process according to claims 1 or 3, further comprising adding to the grafted bitumen from 2 to 10 parts per 100 parts modified bitumen of a tri-block copolymer with a linear or cyclic structure of a molecular weight within the range of 100,000 and 300,000, and covulcanizing said graft bitumen and said block copolymer in the presence of from 0.1 to 3 parts sulfur per 100 parts grafted bitumen and of a vulcanization accelerator at 200° C. for 4 hours.

8. A process according to claims 1 or 3, further comprising adding to the modified bitumen from 2 to 10 parts of an elastomer having a molecular weight of 2,000,000 per 100 parts grafted bitumen and covulcanizing said modified bitumen and said elastomer in the presence of from 0.1 to 3 parts sulfur per 100 parts modified bitumen and of a vulcanization accelerator at a temperature of 200° C. for 4 hours.

9. A composition of polymeric bitumens made by the process of claims 1, 2 or 3.

10. A process according to claim 3, wherein 0.5 parts of zinc oxide is used as the catalyst.

11. A process according to claim 6, wherein the grafted bitumen is vulcanized at a temperature of from 140° to 160° C.

12. A process according to claim 8, wherein said elastomer is polynorbornene.

* * * * *

UNITED STATES PATENT AND TRADEMARK OFFICE
CERTIFICATE OF CORRECTION

PATENT NO. : 4,237,052
DATED : December 2, 1980
INVENTOR(S) : Fredj Fitoussi, et al It is certified that error appears in the above—identified patent and that said Letters Patent is hereby corrected as shown below:

Column 2, line 27: "staring" should read --starting--.

Signed and Sealed this

Seventh Day of April 1981

[SEAL]

Attest:

RENE D. TEGTMEYER

Attesting Officer        Acting Commissioner of Patents and Trademarks